(12) United States Patent
Tysowski et al.

(10) Patent No.: US 8,275,741 B2
(45) Date of Patent: Sep. 25, 2012

(54) METHOD AND APPARATUS FOR MEMORY MANAGEMENT IN AN ELECTRONIC DEVICE

(75) Inventors: Piotr K. Tysowski, Waterloo (CA); Matthew Bells, Waterloo (CA)

(73) Assignee: Research In Motion Limited, Waterloo (CA)

( * ) Notice: Subject to any disclaimer, the term of this patent is extended or adjusted under 35 U.S.C. 154(b) by 0 days.

(21) Appl. No.: 11/616,353

(22) Filed: Dec. 27, 2006

(65) Prior Publication Data

US 2008/0162501 A1 Jul. 3, 2008

(51) Int. Cl.
*G06F 7/00* (2006.01)
*G06F 17/00* (2006.01)

(52) U.S. Cl. ......... 707/609; 707/610; 707/620; 709/248

(58) Field of Classification Search ........................ None
See application file for complete search history.

(56) References Cited

U.S. PATENT DOCUMENTS

| | | | |
|---|---|---|---|
| 5,805,164 A | 9/1998 | Blum et al. | |
| 6,157,967 A * | 12/2000 | Horst et al. | 710/19 |
| 6,202,060 B1 * | 3/2001 | Tran | 707/3 |
| 6,272,293 B1 | 8/2001 | Matama | |
| 6,341,316 B1 | 1/2002 | Kloba et al. | |
| 6,470,329 B1 | 10/2002 | Livschitz | |
| 6,536,037 B1 * | 3/2003 | Guheen et al. | 717/151 |
| 6,654,746 B1 | 11/2003 | Wong et al. | |
| 6,892,221 B2 | 5/2005 | Ricart et al. | |
| 6,904,570 B2 | 6/2005 | Foote et al. | |
| 6,957,395 B1 | 10/2005 | Jobs et al. | |
| 7,007,239 B1 | 2/2006 | Hawkins et al. | |
| 7,028,054 B2 * | 4/2006 | Harper et al. | 1/1 |
| 7,225,409 B1 | 5/2007 | Schnarel et al. | |
| 7,577,272 B2 | 8/2009 | Harmanci et al. | |
| 7,685,296 B2 | 3/2010 | Brill et al. | |
| 7,689,601 B2 | 3/2010 | Wu | |
| 7,707,487 B2 | 4/2010 | Easter et al. | |
| 2002/0069218 A1 * | 6/2002 | Sull et al. | 707/501.1 |
| 2002/0123368 A1 | 9/2002 | Yamadera et al. | |
| 2002/0132612 A1 * | 9/2002 | Ishii | 455/414 |
| 2002/0147661 A1 | 10/2002 | Hatakama et al. | |

(Continued)

FOREIGN PATENT DOCUMENTS

EP 0171663 A2 2/1986

(Continued)

OTHER PUBLICATIONS

"Time-Dependent Unsolicited Help", IBM Technical Disclosure Bulletin, IBM Corp, New York, vol. 31 No. 3, Aug. 1, 1988, XP000106189, ISSN: 0018-8689.

(Continued)

*Primary Examiner* — Angelica Ruiz
(74) *Attorney, Agent, or Firm* — Perry + Currier Inc.; Kristjan Spence

(57) ABSTRACT

A method of memory management in an electronic device, includes receiving at the electronic device, representative viewable or audible samples of data records, and storing the representative viewable or audible samples of data records in a memory of the electronic device. Each of the representative viewable or audible samples of data records includes one of a compressed version of a corresponding one of the backup data records, and a viewable or audible portion of the corresponding one of the backup data records.

12 Claims, 7 Drawing Sheets

U.S. PATENT DOCUMENTS

| | | | |
|---|---|---|---|
| 2003/0134625 A1 | 7/2003 | Choi | |
| 2004/0036722 A1 | 2/2004 | Warren | |
| 2004/0039722 A1 | 2/2004 | Kudo et al. | |
| 2004/0039989 A1 | 2/2004 | Warren | |
| 2004/0073868 A1 | 4/2004 | Easter et al. | |
| 2004/0224672 A1 | 11/2004 | Linkert et al. | |
| 2004/0243256 A1* | 12/2004 | Willis et al. | 700/21 |
| 2005/0050473 A1 | 3/2005 | Lamb et al. | |
| 2005/0060230 A1 | 3/2005 | Kaye | |
| 2005/0060370 A1 | 3/2005 | Xue et al. | |
| 2005/0131900 A1 | 6/2005 | Palliyll et al. | |
| 2005/0138176 A1 | 6/2005 | Singh et al. | |
| 2005/0197906 A1* | 9/2005 | Kindig et al. | 705/15 |
| 2006/0008256 A1* | 1/2006 | Khedouri et al. | 386/124 |
| 2006/0010227 A1* | 1/2006 | Atluri | 709/217 |
| 2006/0010500 A1* | 1/2006 | Elazar et al. | 726/27 |
| 2006/0029296 A1* | 2/2006 | King et al. | 382/313 |
| 2006/0053383 A1 | 3/2006 | Gauthier et al. | |
| 2006/0080427 A1 | 4/2006 | Yach et al. | |
| 2006/0111086 A1 | 5/2006 | Wilson et al. | |
| 2006/0167784 A1* | 7/2006 | Hoffberg | 705/37 |
| 2006/0168351 A1* | 7/2006 | Ng et al. | 709/248 |
| 2006/0179404 A1 | 8/2006 | Yolleck et al. | |
| 2006/0183097 A1* | 8/2006 | Ishii | 434/307 R |
| 2006/0206582 A1* | 9/2006 | Finn | 709/217 |
| 2006/0211404 A1* | 9/2006 | Cromp et al. | 455/405 |
| 2006/0235864 A1 | 10/2006 | Hotelling et al. | |
| 2006/0253796 A1 | 11/2006 | Wang et al. | |
| 2006/0271870 A1 | 11/2006 | Anwar | |
| 2007/0087756 A1* | 4/2007 | Hoffberg | 455/450 |
| 2007/0101278 A1 | 5/2007 | Pickering et al. | |
| 2007/0118809 A1 | 5/2007 | Ozugur et al. | |
| 2007/0250645 A1 | 10/2007 | Meadows et al. | |
| 2007/0254721 A1 | 11/2007 | Griffin et al. | |
| 2007/0281733 A1 | 12/2007 | Griffin et al. | |

FOREIGN PATENT DOCUMENTS

| | | |
|---|---|---|
| EP | 1215596 A1 | 6/2002 |
| EP | 1564658 A | 8/2005 |
| EP | 1798644 A | 6/2007 |
| GB | 2341952 A | 3/2000 |
| WO | 00/29977 A1 | 5/2000 |
| WO | 2004010306 A | 1/2004 |
| WO | 2004/055659 A1 | 7/2004 |

OTHER PUBLICATIONS

Brinkschulte, C., et al: "SyncML Client Server", Internet Citation, Jan. 10, 2003, XP002346046, URL: http://www.weblicon.net/downloads/e_documents/SyncML_Client_Server 1.8.pdf.

Firefalcon: "Textbox with Tool Tip Control Implementation", The Code Project, [Online] Aug. 6, 2006, XP002435398; URL: http://www.codeproject.com/useritems/textboxwithtooltipcontrol.asp [retrieved on May, 24 2007.

Studio 7.5: "Designing for Small Screens", Oct. 2005, AVA Publishing SA, Lausanne CH, XP002435401, ISBN: 2-940373-07-8, pp. 140-141.

[Online] 7 May 2002, XP007914509 The Code Project Retrieved from the Internet: URL: http://www.codeproject.com/KB/cpp/autocomplete_combobox.aspx [retrieved on Aug. 18, 2010].

European Patent Office correspondence "Summons to attend oral proceedings pursuant to Rule 115(1) EPC" dated Oct. 26, 2010 on corresponding European Patent Application No. 06127200.1.

Kaasten S. et al.: Designing an Integrated Bookmark/History System for Web Browsing, Proceedings Western Computer Graphics Symposium, Mar. 1, 2000 XP 008031090.

European Patent Application No. 06 127 202.7 Examination Report dated Apr. 13, 2011.

Related Canadian Patent Application No. 2,615,561 Office Action dated Mar. 24, 2011.

* cited by examiner

METHOD AND APPARATUS FOR MEMORY MANAGEMENT IN AN ELECTRONIC DEVICE

FIELD

The present application relates generally to portable electronic devices and more particularly to memory management at a portable electronic device.

BACKGROUND

Portable electronic devices such as wireless personal digital assistants (PDAs), smart telephones and laptop computers with wireless capabilities have gained widespread use for a variety of functions. Such devices are commonly used for communication purposes including transportation of data, and run on a wide variety of networks from data-only networks such as Mobitex and DataTAC to complex voice and data networks such as GSM/GPRS, CDMA, EDGE, UMTS AND W-CDMA networks.

These portable electronic devices commonly include databases for storing data that is selectably retrievable by a user of a device. The data forms a series of data records, each data record containing one or more fields. During operation of the device, the data is retrieved and displayed, or otherwise made available to the user. The data can be modified, added to or deleted by the user of the device.

Advances in data storage have accompanied advances in portable electronic devices, to provide for back-up of data stored at the electronic device. By backing-up the device, data can be recovered in the event of data loss at the electronic device. Various electronic devices are backed-up by way of communication over a fixed (wire) connection between the electronic device and, for example, a computing station such as a desktop computer. Once the data is stored in a database at the computing station, the stored data can be modified, added to or deleted by a user at the computing station.

Other portable electronic devices provide for back-up of data stored thereon, to a computing station by way of a radio interface, using, for example, the networks listed above. Thus, data is sent over a radio communication channel of a radio communication system, thereby forming a communications link between the portable electronic device and a remote station (a station not linked by wire communication). Again, once the data is stored in a database at a computing station, the stored data can be modified, added to or deleted at the computing station. Thus, while data stored in the database of the portable electronic device is backed-up to a computing station, data is also transmitted from the computing station to the portable electronic device to synchronize the databases of the portable electronic device with the databases of the computing station. Data records are transmitted from the portable electronic device to the computing station to provide a backup for restore capabilities. During the restore synchronization data records are transmitted from the computing device to the portable electronic device.

Data synchronization over a radio communication channel is clearly advantageous as data can be communicated remotely over large distances. Conventional manners of data synchronization over radio communication channels suffer disadvantages, however. Such data synchronization can be prohibitively bandwidth consumptive. If many records are transferred or if the size of the record or records transferred is large, the transfer time can be extensive meaning that a communication channel is opened for a long period of time to transfer the data records, which can be costly for the user. Improvements in synchronizing databases connected by wireless interface are therefore desirable.

Memory management in electronic devices is also an important consideration due to limited size of available memory in many portable electronic devices, for example. Such memory management in an electronic device is important both during synchronization and external to synchronization. Improvements in memory management methods are also desirable.

BRIEF DESCRIPTION OF THE DRAWINGS

The method and apparatus for synchronizing databases connected by wireless interface will be better understood with reference to the following description and to the Figures, in which.

DETAILED DESCRIPTION OF THE EMBODIMENTS

Figure 1:
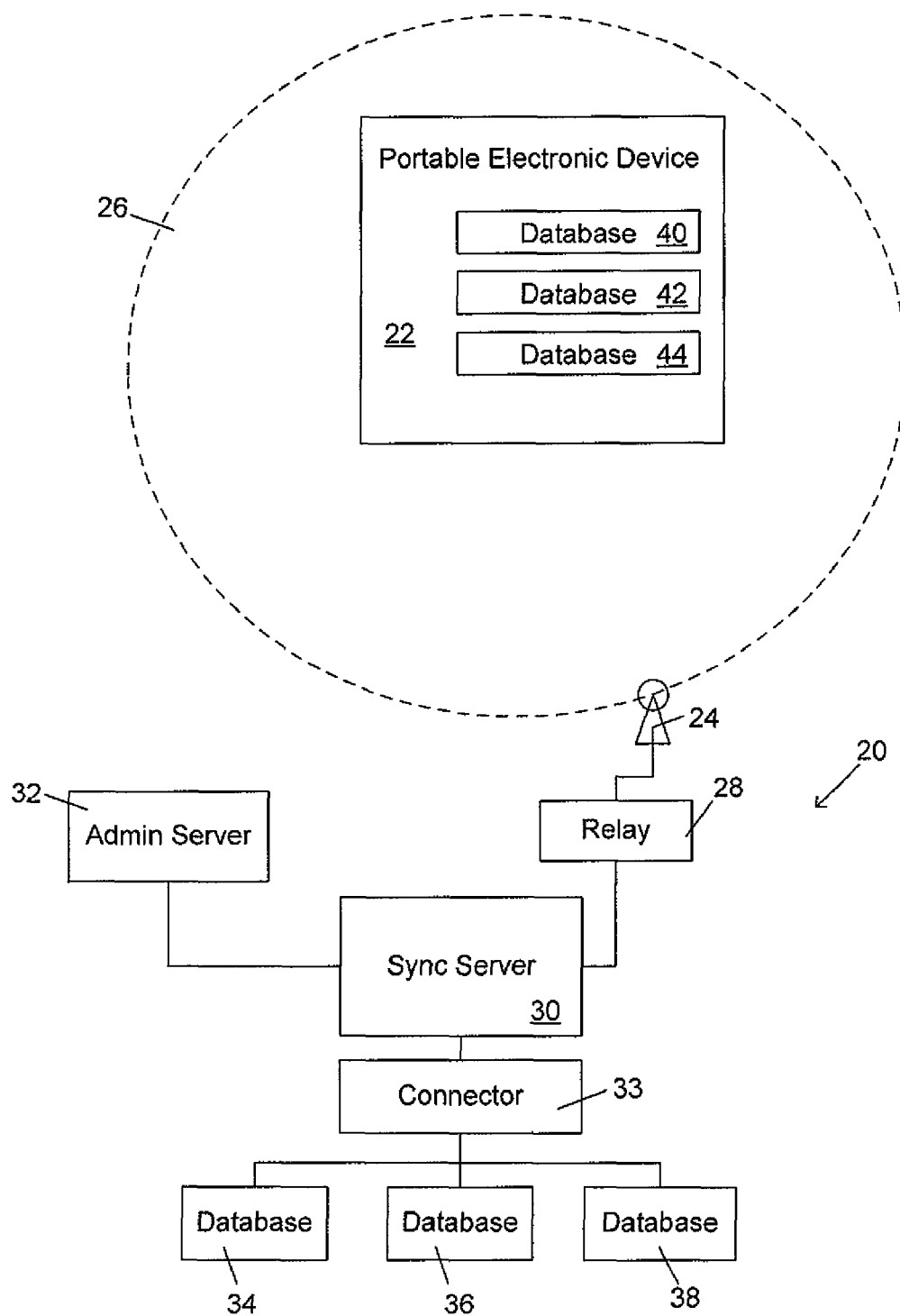
FIG. 1 is a functional block diagram of a radio communication system and portable electronic device.

Reference is first made to FIG. 1 which shows a functional block diagram of a radio communication system indicated generally by the numeral 20 and a portable electronic device 22. The radio communication system 20 provides for communications with portable electronic devices including the exemplary portable electronic device 22, as shown. The portable electronic device 22 and the radio communication system 20 are operable to effect communications over a radio communications channel therebetween. Data originating at the portable electronic device 22 is communicated to the radio communication system 20 by way of the radio communications channel. Similarly, data originating at the communication system 20 is communicated from the radio communication system 20 to the portable electronic device 22 by way of the radio communications channel, thereby providing data to the portable electronic device 22.

For the purposes of illustration, the communication system 20 is functionally represented in FIG. 1 and a single base station 24 is shown. The base station 24 defines a coverage area, or cell 26 within which communications between the base station 24 and the portable electronic device 22 can be effectuated. It will be appreciated that the portable electronic device 22 is movable within the cell 26 and can be moved to coverage areas defined by other cells that are not illustrated in the present example. The communication system 20 includes a relay device 28 that is connected to the base station 24 and to a synchronization server 30. It will be understood that the functions provided by the relay device 28 and the synchronization server 30 can be embodied in the same device. The synchronization server 30 is connected to an administration server 32, as shown. The administration server 32 provides administrative services to the communications system 20 and, for instance, provides administrative control over the synchronization server 30.

The synchronization server 30 is also functionally coupled through a personal information management connector 33 to databases, of which, three exemplary database types including a first database 34, a second database 36, and a third database 38 are shown. The personal information management connector 33 interfaces between the synchronization server 30 and the databases 34, 36, 38. It will be understood that the personal information management connector 33 is a functional component and can be provided by way of an application on the synchronization server 30. The data maintained in the first, second, and third databases 34, 36, 38 includes a number of data records.

The portable electronic device 22, of which only particular functional portions are shown in FIG. 1 for the purposes of the present description, includes a plurality of databases 40, 42, 44 that correspond to the first, second and third databases 34, 36, 38, respectively, of the communication system 20. The databases 34, 36, 38 and the databases 40, 42, 44, can be selectably altered in an asymmetrical manner such that the databases 34, 36, 38 of the communication system 20 do not match the databases 40, 42, 44 of the portable electronic device 22. In other words, any or all of the databases 34, 36, 38, 40, 42, 44 can be altered by adding records, deleting records and modifying fields of the records by adding, deleting or modifying the data populating those fields.

Figure 2:
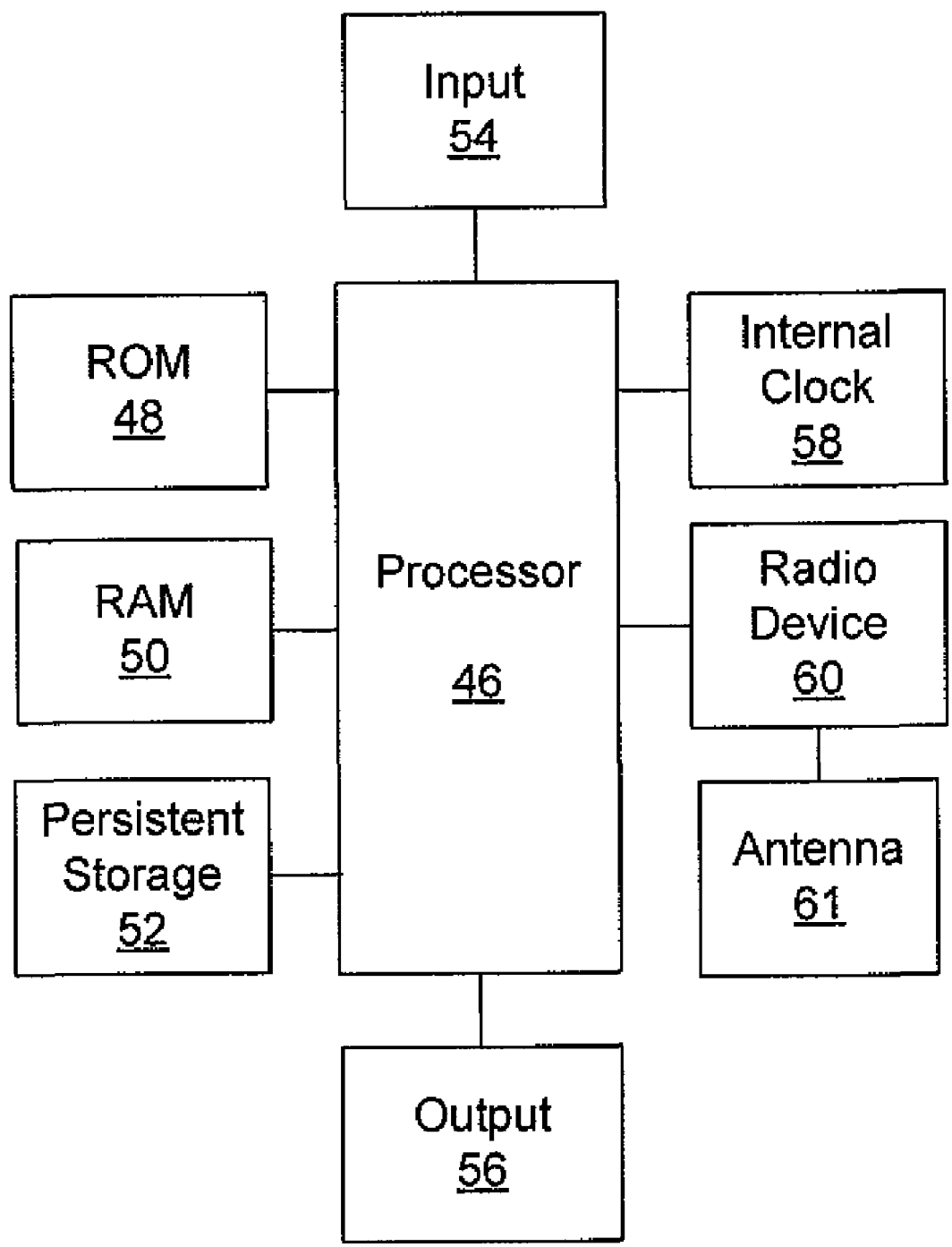
FIG. 2 is a block diagram of certain internal components within the portable electronic device.

Reference is now made to FIG. 2 which shows a block diagram of certain internal components within the portable electronic device 22. The portable electronic device 22 is based on a microcomputer that includes a processor 46 connected to a read-only-memory (ROM) 48 that contains a plurality of applications executable by the processor 46 to enable the portable electronic device 22 to perform certain functions including synchronization with the communication system 20. The processor 46 is also connected to a random access memory unit (RAM) 50 and a persistent storage device 52 which are responsible for various non-volatile storage functions of the portable electronic device 22 and in which the databases 40, 42, 44 are maintained. The processor 46 receives input from input devices 54 such as a keyboard. The processor 46 outputs to output devices 56 such as an LCD display. The processor 36 is also connected to an internal clock 58 and a radio device 60 which in turn is connected to an antenna 61. Together the radio device 60 and the antenna 61 are used to connect to the radio communication system 20 over a radio communications channel. Thus, the portable electronic device 22 is operable to receive and transmit communication signals containing data that is communicated to and from the communication system 20 via the radio device 60 and the antenna 61.

It will be understood that the functions described herein can be carried out in any suitable manner. In the present example, the functions are carried out by algorithms executable by the processor 46 in a synchronization application. For example, the processor 46 of the portable electronic device 22 is operable to perform hash functions by retrieving the data from one or more of the databases 40, 42, 44 of the persistent storage device 52 and generating a hash, thereby placing the accessed data in short-digest form. Hash functions performed by the processor 46 include, for example, computation of check sums as well as other hash function computations. The processor 46 is further operable to provide the generated hash to the radio device 60 for transmission from the portable electronic device 22 to the radio communication system 20 over the radio communications channel. Hash generation is triggered either by an input from the input device 54 or by a signal received from communication system 20.

The microcomputer of the portable electronic device 22 is operable to receive communications from the communication system 20. For example, the microcomputer is operable to receive a request for additional hash information and in response, to provide additional hash information by retrieving data from one or more of the databases 40, 42, 44, performing hash functions on the data, thereby generating an additional hash and transmitting the additional hash to the communication system 20. The microcomputer is further operable to receive a request for data records which, in response to such a request, the data records are retrieved from one or more the databases 40, 42, 44 and transmitted to the communication system 20. Further still, the microcomputer is operable to receive data transmitted from the communication system 20 and to write the data by adding the data to one or more of the databases 40, 42, 44 or overwriting data on one or more of the databases 40, 42, 44, maintained on the persistent storage device 52. The microcomputer is further operable to determine a size of memory available on the persistent storage device 52, to compare the available memory to the memory required to store a data record. Further still, the microcomputer is operable to create a representative viewable or audible sample of a full data record and to write the representative sample of the full data record over the associated full content data record of a database to make memory available on the persistent storage device 52.

Figure 3:
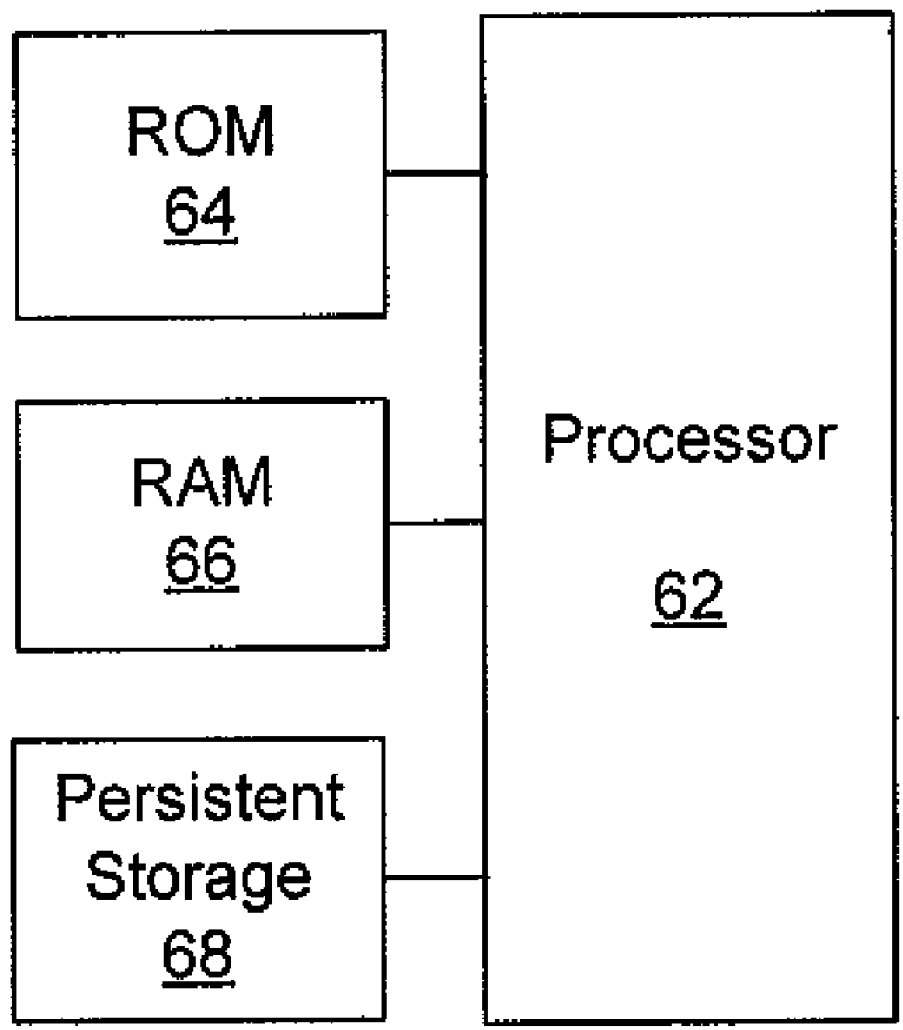
FIG. 3 is a block diagram of certain internal components within a synchronization server.

Reference is now made to FIG. 3 which shows a block diagram of certain internal components within the synchronization server 30. Similar to the portable electronic device 22, the synchronization server 30 includes a processor 62 connected to a read only memory (ROM) 64 that includes applications executable by the processor 62 and enables the synchronization server 30 to perform certain functions including synchronization with the portable electronic device 22. The processor 62 is also connected to a random access memory unit (RAM) 66 and a persistent storage device 68 which are responsible for various non-volatile storage functions of the synchronization server 30. The processor 62 is connected to the databases 34, 36, 38 and to the relay device 28, which in turn is connected to the base station 24 for connecting to the portable electronic device 22 over a radio communications channel. Thus, the synchronization server 30 is operable to receive and transmit communication signals containing data that is communicated to and from the portable electronic device 22 via the relay device 28 and the base station 24.

Again, it will be understood that the functions described herein can be carried out in any suitable manner. In the present example, the functions are carried out by algorithms executable by the processor 62. For example, the processor 62 of the synchronization server 30 is operable to perform hash functions by retrieving the data from one or more of the databases 34, 36, 38 and generating a hash, thereby placing the accessed data in short-digest form. The processor 62 is further operable to provide the generated hash to the relay device 28 for transmission to the portable electronic device 22.

The synchronization server 30 is operable to receive communications generated by the portable electronic device 22 relating to synchronization. For example, the synchronization server 30 is operable to receive the hash generated by the portable electronic device 22 and, in response, to compare the hash information from this hash to the hash information from the locally generated hash, generated by the synchronization server 30. The synchronization server 30 is also operable to request additional information from the portable electronic device 22, based on and in response to results of the comparison of the hash information from the hash generated by the portable electronic device 22 with the hash information from the locally generated hash. The request for additional information is provided to the relay 28 and, through the base station 24, is transmitted to the portable electronic device 22. The request for additional information can be a request for additional hash information or a request for data records, depending on the results of the comparison of the hash information from the hash generated by the portable electronic device 22 with the hash information from the locally generated hash. Further, the synchronization server 30 is operable to receive data transmitted from the portable electronic device 22 (through the base station 24 and relay device 28) and to write the data by adding the data to one or more of the databases 34, 36, 38 or overwriting the data on one or more of the databases 34, 36, 38. Further still, the synchronization server 30 stores synchronization history data in the persistent storage device 68, thereby maintaining a listing of changes made to the databases 34, 36, 38 connected to the synchronization server 30 and to the databases 40, 42, 44 of the portable electronic device 22. The synchronization server 30 accesses the synchronization history data during synchronization operations to reduce the data communicated between the communication system 20 and the portable electronic device 22 in subsequent synchronizations by determining previously synchronized data.

The synchronization server 30 is further operable to store an update type, referred to herein as a full data record update type in association with each data record. The full data record update type is an indication that the data record is to be fully transferred to the portable electronic device 22 during synchronization processes over the radio communications connection. The full data record update type can be determined based on a number of factors. For example, the data record update type can be determined based on the database to which the data records belong. Data records from certain databases can be indicated for full transfer of the entire record when a record is added or changed on the synchronization server 30, thereby ensuring that the data records of those databases on the portable electronic device 22 are always complete and match in full, the data records of the corresponding database on the synchronization server 30. For other data records, however, full content may not be necessary and accordingly, these data records are not indicated as full data record update types.

Figure 4:
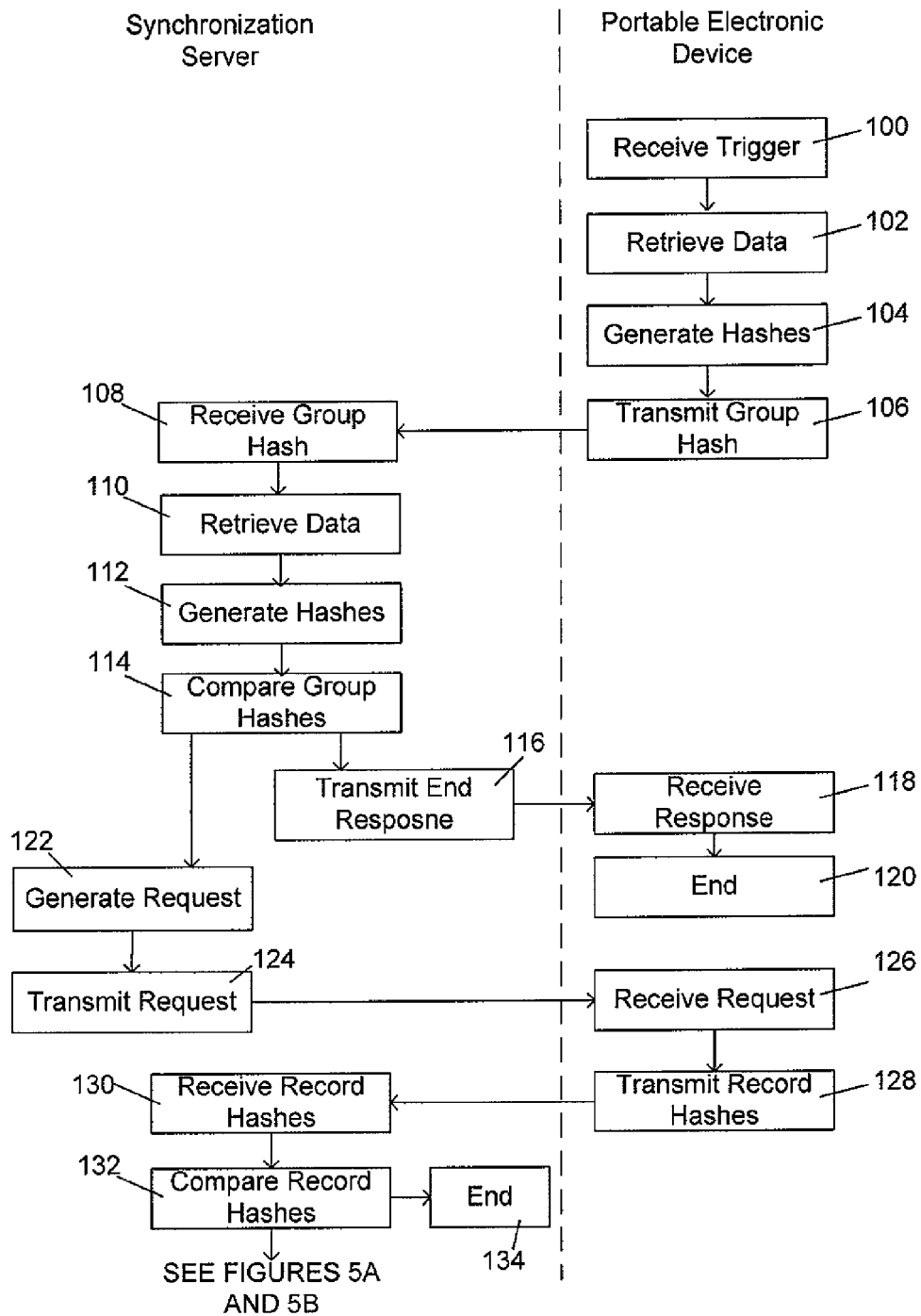
FIG. 4 is a sequence diagram illustrating functions carried out at both the portable electronic device and the communication system during synchronization of databases connected by wireless interface.

Reference is now made to FIG. 4, which shows a sequence diagram illustrating functions carried out at both the portable electronic device 22 and the communication system 20 during synchronization of databases connected by wireless interface, in accordance with one embodiment of the present application. Coding of software for carrying out such steps is well within the scope of a person of ordinary skill in the art. First, the portable electronic device 22 receives a synchronization trigger at 100, from, for example, a user input on the input device 54, triggering a synchronization process for one of the databases 40, 42, 44. In the present example, synchronization is triggered for the first database 40. In response to receipt of the synchronization trigger, data is retrieved from the database 40 at step 102 and the processor 46 first generates a record hash for each data record of the database 40 and then generates a group hash for the database 40, based on the individual record hashes at step 104. Thus, the group hash is a hash representative of the data records of the database 40. After generation of the group hash, an initialize command is transmitted along with the group hash at step 106 to the communication system 20 over a radio communication channel. The initialize command initiates the synchronization process at the synchronization server 30, identifies the database for synchronization and provides synchronization session state information including a session state identifier.

The communication system 20 receives the initialize command along with the group hash at step 108 by receipt at the base station 24. The base station 24 forwards the initialize command and the group hash to the synchronization server 30. As indicated above, the initialize command identifies the database for synchronization and provides synchronization session state information including the session state identifier. A synchronization session is thereby started with the portable electronic device 22. In response to receipt of the initialize command, the synchronization server 30 retrieves the data records from the database on the communication system side 20 that corresponds with the database being synchronized on the portable electronic device 22, through the personal information management connector 33. In the present example, the first database 34 corresponds with the first database 40 of the portable electronic device 22 and thus, it is the records of the first database 34 that are retrieved at step 110. At step 112, the processor 62 of the synchronization server 30 first generates a record hash for each data record of the database 34. The record hashes are referred to herein as the locally generated record hashes. For any data record for which only a representative viewable or audible sample of that data record exists in the corresponding database on the portable electronic device 22, the hash that is generated at the synchronization server 30 (at step 112) is equivalent or in match with the hash generated for the representative viewable or audible sample of the data record at the portable electronic device 22. Thus, the hash generated for each full content data record at the synchronization server 30 is a match to the corresponding hash of the representative viewable or audible sample of the data record at the portable electronic device 22. From the locally generated record hashes, a group hash for the database 34 is generated. Thus, the group hash is representative of the data records of the database 34 and is referred to herein as the locally generated group hash. After generation of the locally generated group hash, the hash information of the group hash received from the portable electronic device 22 is compared with the hash information of the corresponding locally generated group hash at step 114. If the comparison of the hash information indicates that the first database 40 of the portable electronic device 22 is not in mismatch with the respective first database 34 of the communication system 20, then a response is sent to the portable electronic device 22 to terminate the synchronization session at step 116.

The response is received at the portable electronic device 22 at step 118 and the synchronization session is terminated at step 120.

If, however, the comparison of the hash information indicates that the database 40 of the portable electronic device 22 is in mismatch with the corresponding database 34 of the communication system 20, then at least one of the databases 34, 40 is to be updated and a request for additional hash information is generated by the synchronization server 30 at step 122. The request for additional hash information is a request for hash information associated with data records. The additional hash information is requested for each data record of the database 40 of the portable electronic device 22 that is determined to be mismatched with the corresponding database 34 of the communication system 20. After generation of the request for additional hash information, the request is then transmitted at step 124 to the portable electronic device 22.

Once the request for additional hash information is received at the portable electronic device 22 at step 126, each record hash generated at step 104 is transmitted at step 128 to the communication system 20 over the radio communication channel. For data records that are representative viewable or audible samples of data records in the database 40 of the portable electronic device 22, the respective hash is generated (at step 104) based on the data in the representative sample.

The additional hash information is received at the communication system 20 and delivered to the synchronization server 30 at step 130. In response to receipt of the requested additional hash information, each hash received from the portable electronic device 22 is compared with the corresponding additional locally generated hash (generated at step 112) at step 132 and a determination is made as to whether the data records of either or both the first database 34 or the first database 40 of the portable electronic device 22, has changed. As previously indicated, for any data record for which only a representative viewable or audible sample of that data record exists in the corresponding database on the portable electronic device 22, the hash that is generated at the synchronization server 30 (at step 112) is equivalent or in match with the hash generated for the representative viewable or audible sample of the data record at the portable electronic device 22. For data records that are determined to match, the synchronization process ends at step 134 for those data records. For data records determined to be in mismatch, however, the comparison at step 132 also determines where the change was made (i.e. at the communication system 20 side or at the portable electronic device 22 side). Thus, data records in which changes have been made at one of the portable electronic device 22 and the communication system 20 that are not reflected in the corresponding data records at the other of the portable electronic device 22 and the communication system 20 are determined by the comparison at step 132. If it is determined at step 132 that the data has changed, the databases are synchronized by updating the data records of the first database 34 at communication system 20 or the first database 40 at the portable electronic device 22 or the first databases 34, 40 at both the communication system 20 and the portable electronic device 22 that are determined to be mismatched. With the determination of a mismatch, a conflict resolution policy is run, thereby determining how the mismatched data records are to be updated (i.e. whether to update the database records on the portable electronic device 22 with the database records of the synchronization server 30, whether to update the database records of the synchronization server 30 with the database records on the portable electronic device 22, or whether to update both).

Figure 5A:
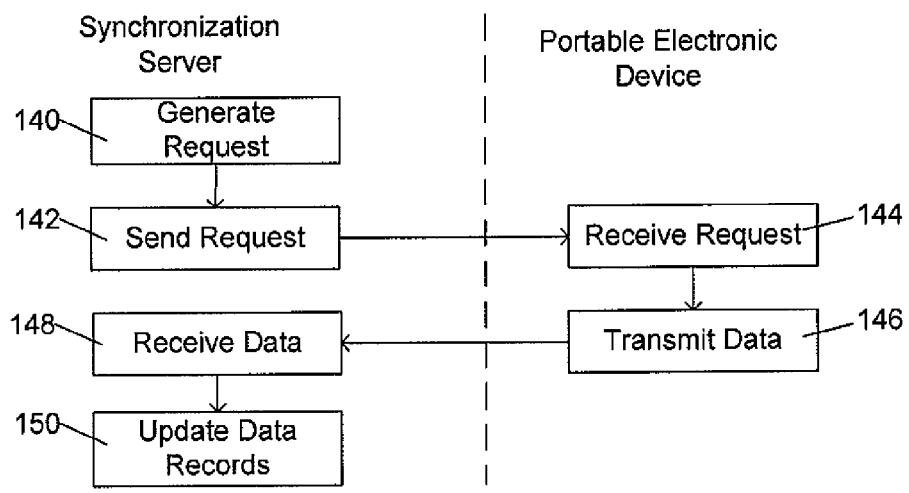
FIGS. 5A and 5B are sequence diagrams illustrating functions carried out at both the portable electronic device and the communication system during updating of databases.

Referring now to FIG. 5A, there is shown a sequence diagram illustrating functions carried out at both the portable electronic device 22 and the communication system 20 during updating of the database 34 of the communication system 20. Again, coding of software for carrying out such steps is well within the scope of a person of ordinary skill in the art. If it is determined at step 132 that additional data records or changes to data records at the portable electronic device 20 are not yet reflected at the communication system 20, a fetch request is generated by the synchronization server 30 as shown at step 140. After generation of the fetch request, the fetch request is transmitted to the portable electronic device 22 at step 142, thereby requesting data records added and changed on the portable electronic device 22 that have not been updated on the synchronization server 30.

The fetch request is then received at the portable electronic device 22 at step 144 and in response, the requested data records are transmitted to the communication system 20 at step 146.

The requested data records are received at the communication system 20 and delivered to the synchronization server 30 at step 148. In response to receipt of the requested data records, the database 34 of the communication system 20 is updated by writing new data records or overwriting to update previously saved data records in the database 34 at step 150.

Figure 5B:
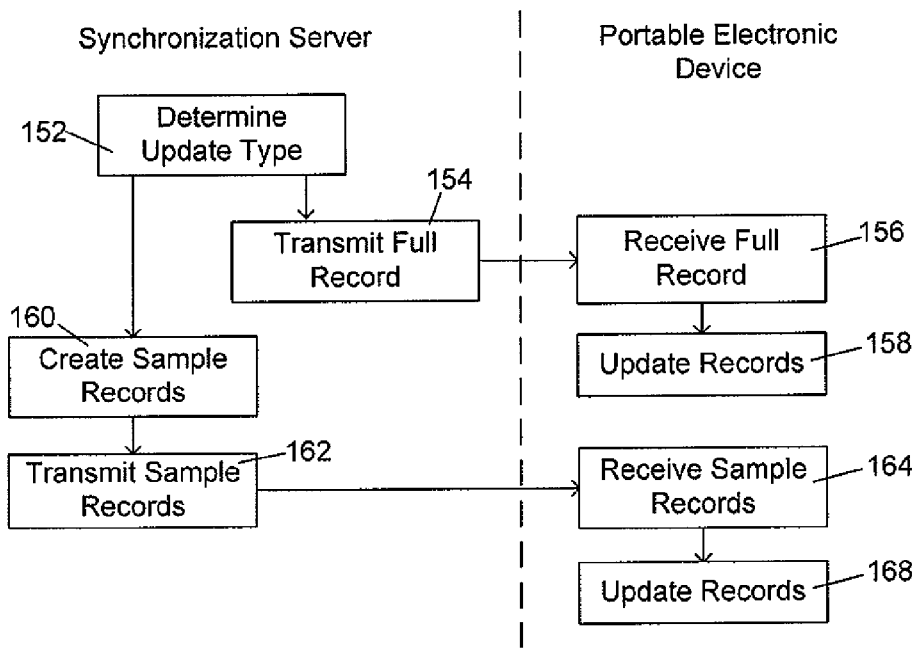

Referring now to FIG. 5B, there is shown a sequence diagram illustrating functions carried out at both the portable electronic device 22 and the communication system 20 during updating of the database 40 at the portable electronic device 22. Yet again, coding of software for carrying out such steps is well within the scope of a person of ordinary skill in the art.

If it is determined at step 132 that additional data records or changes to data records at the communication system 20 are not reflected at the portable electronic device 20, the data records that have been added or changed on the synchronization server 30 are updated at the portable electronic device 22. To do this, the data record update type is determined for each of the data records that have been added or changed on the synchronization server 30 at step 152. As indicated hereinabove, the data record update type is an indication of whether the full content data record is to be transferred to the portable electronic device 22 during the synchronization process over the radio communications connection or if a representative viewable or audible sample of the data record is to be transferred to the portable electronic device 22.

If, for a particular record, it is determined that the full content data record is to be transferred based on the determination at step 152, the full record is transmitted at step 154.

The portable electronic device 22 receives the full record at step 156 and updates the data records at step 158 by overwriting to update the previously saved data record in the database 40.

If, on the other hand, it is determined at step 154, that a particular record is not indicated as a full content data record update type, a representative viewable or audible sample of the data record is created at the synchronization server 30 at step 160. In the present embodiment, the representative viewable or audible sample is created by creating a viewable or audible portion of the data record. Thus, for an image data record, a thumbnail image data record is created. Similarly, for a sound data record, a sound clip of a portion of the sound data record is created. For a multi-page document such as a word processor document, a representative page such as the first page of the document is created as a sample data record. The representative sample data record includes data sufficient to uniquely identify the corresponding full data record at the communication system 20. Thus, the representative sample data record includes a reference to the respective data record of the communication system 20. After creation of the representative viewable or audible samples of the data record, the representative samples are transmitted at step 162 to the portable electronic device 22.

The representative viewable or audible sample of the data record that is transmitted at step 162 is received at the portable electronic device 22 at step 164, marked as a representative sample data record by, for example, adding a flag in the record header to indicate that the record is partial and that more of the record can be requested, and the database 40 of the portable electronic device 22 is updated with this representative sample data record at step 168. Thus, the representative viewable or audible sample of the data record that is transmitted to the portable electronic device 22 is identified as a representative viewable or audible sample of the data record and is stored by writing or overwriting on to the database 40 of the portable electronic device 22. The process of receiving the representative viewable or audible sample of the data record at step 164 and storing at step 168 is repeated until each of the representative viewable or audible samples of the data records is stored.

It will be understood that during synchronization, representative sample data records on the portable electronic device 22 consisting of samples of data only are identified as such at the portable electronic device 22 and at the communication system 20 and hash operations for each such record are based on the samples of data. Thus, the hash generated at step 104 at the portable electronic device 22 is based on the samples of data for all representative sample data records. Correspondingly, for the those full records on the synchronization server 30 that correspond to representative sample data records on the portable electronic device 22, each hash generated at step 112 at the synchronization server 30 is based on the corresponding samples of data only. Thus, the comparison of hash information for these records is based on hashes generated from the samples of data at step 132. When the hash values are determined to match, no update is carried out.

Figure 6:
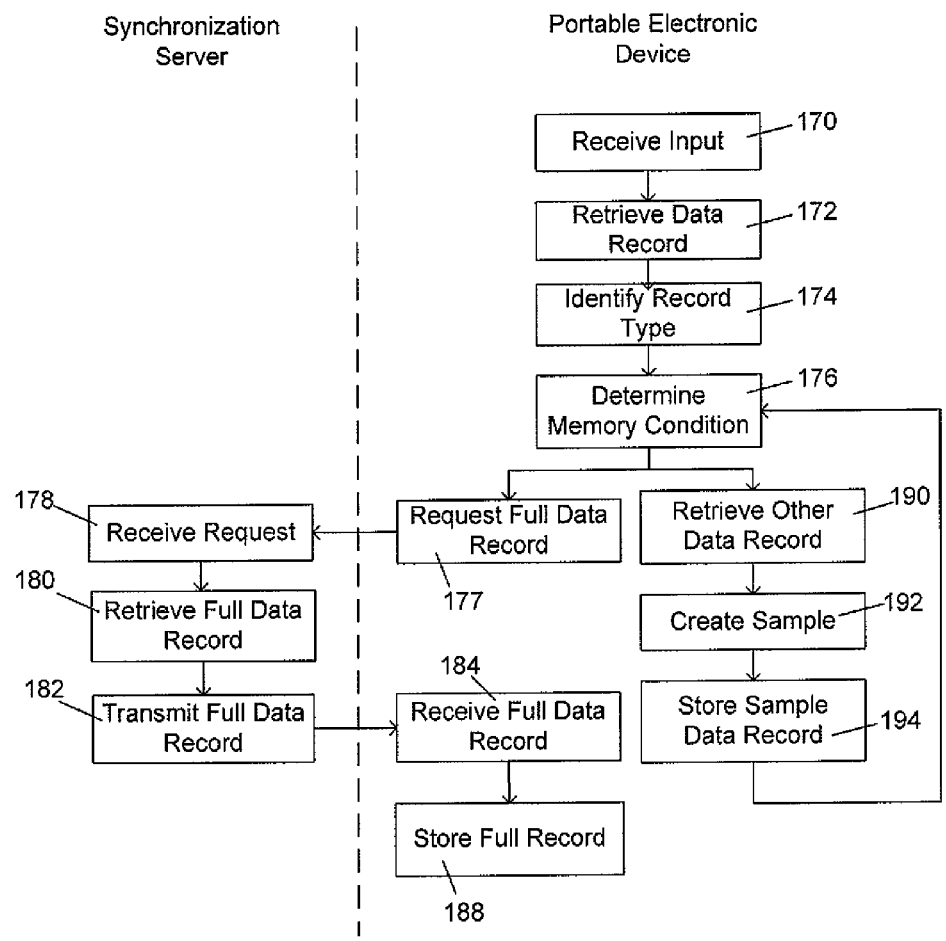
FIG. 6 is a sequence diagram illustrating functions carried out at both the portable electronic device and the communication system when a partial content data record is accessed by a user.

Reference is now made to FIG. 6 which shows a sequence diagram illustrating functions carried out at both the portable electronic device 22 and the communication system 20 when a representative sample data record is accessed by a user of the portable electronic device 22. Such a representative sample data record can be received during a synchronization process as described above, or external to the synchronization process, during a memory management process as described below. Yet again, coding of software for carrying out such steps is well within the scope of a person of ordinary skill in the art. When a user attempts to access a representative sample data record by attempting to open the record using the input device 54 on the portable electronic device 22, the portable electronic device 22 receives the input requesting the data record at step 170. At step 172 the data record is retrieved from the database 40 to which it belongs and at step 174, the data record is identified as a representative sample data record.

Next, the portable electronic device 22 determines if a low memory condition exists at the portable electronic device 22, for example if there is sufficient memory available for storage of the full content data record at step 176. The determination of whether or not sufficient memory is available is based on a comparison of available memory on the persistent storage device 52 of the portable electronic device 22 with the size of the full content data record. If there is sufficient memory available, a request for the corresponding full content data record is generated based on the information contained in the representative sample data record, and transmitted to the communication system 20 at step 177.

The synchronization server 30 receives the request for the full content data record at step 178 and retrieves the full content data record from the appropriate database 34 through the personal information management connector 33 at step 180. The full content data record is transmitted to the portable electronic device at step 182.

The full content data record is then received at the portable electronic device 22 at step 184 and is stored by overwriting over the previously saved representative sample data record in the database 40 at step 188.

If, on the other hand, it is determined that there is insufficient memory available to receive and store the full content data record or a low memory condition is determined, then a second full content data record previously saved is retrieved at step 190 from the same database 40 of the portable electronic device 22, in which the full content data record received at step 184 is to be stored. In the present example, the second full content data record previously saved is a full content data record that the user has not accessed for some period of time. The second full content data record is then used to create a representative viewable or audible sample of the second full content data record at the portable electronic device 22 at step 192. In the present embodiment, the representative viewable or audible sample is created by creating a viewable or audible portion of the data record. Thus, for an image data record, a thumbnail image data record is created. Similarly, for a sound data record, a sound clip of a portion of the sound data record is created. For a multi-page document such as a word processor document, a representative page such as the first page of the document is created as a sample data record.

The newly created representative sample of the second data record is then marked as a representative sample data record by, for example, adding a flag in the record header to indicate that the record is partial and that more of the record can be requested, and the sample data record is stored by overwriting the previously stored second full content data record, thereby freeing up available memory space in the appropriate database at step 194. The portable electronic device 22 then returns to step 176 to determine if there is now sufficient memory to receive and store the full content data record. The process of converting full content data records to representative sample data records continues until sufficient memory is available to receive and store the full content data record. Thus, representative sample data records can be replaced by full content data records by selectably transmitting the full content data records in full from the synchronization server 30 to the portable electronic device 22. It will be understood that the full content data records that are replaced by representative sample data records can be selected based on any suitable factor. For example, data records can be selected based on the last time the data record was accessed.

Figure 7:
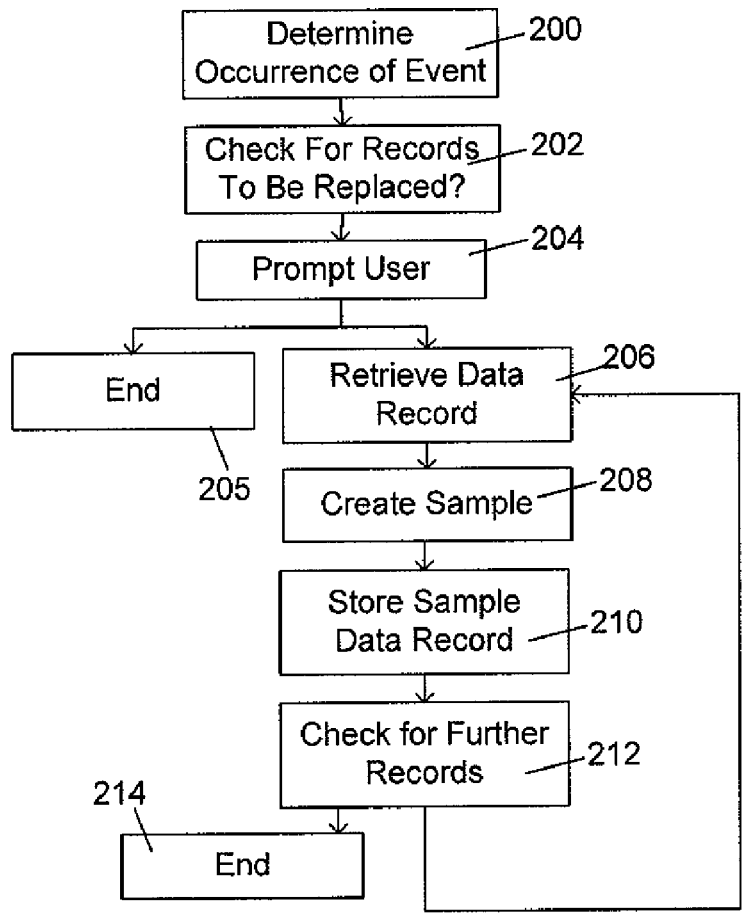
FIG. 7 is a sequence diagram illustrating functions carried out at the portable electronic device during memory management.

Reference is now made to FIG. 7 which shows a sequence diagram illustrating functions carried out at both the portable electronic device 22 and the communication system 20 during memory management at the portable electronic device 22. Yet again, coding of software for carrying out such steps is well within the scope of a person of ordinary skill in the art. In the present example, the portable electronic device 22 automatically initiates memory management on a periodic basis. For example, memory management can be carried out each month. Thus, at the first of every month, for example, memory management is initiated at the portable electronic device 22. The date and time of memory management in this case is determined by the date and time of the internal clock 58 at the portable electronic device 22. Thus, the portable electronic device 22 determines the occurrence of an event (the regularly scheduled time) and begins memory management at step 200.

Figure 8:
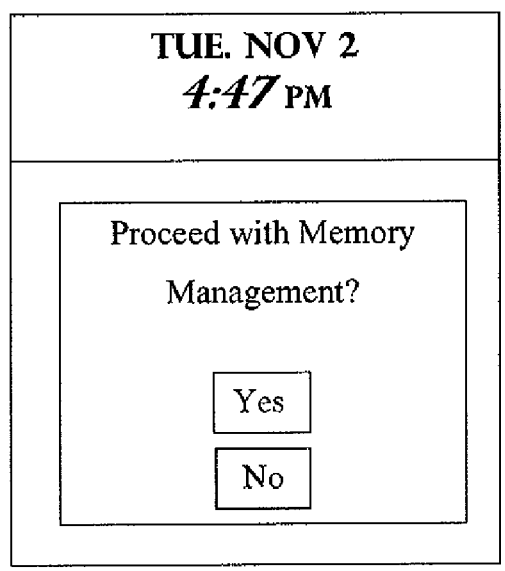
FIG. 8 is a screen shot showing a display device of the portable electronic device during one step of the memory management of FIG. 7.

With the occurrence of this event, the portable electronic device 22 determines if any full data record exists that is to be replaced with a representative sample of that data record at step 202. For each of the full data records that exist in the database 40 and that are not indicated as being full data record update type, the portable electronic device 22 determines the last time the full data record has been accessed by the user and uses this time to determine if the full data records are to be replaced by representative sample data records. For example, the portable electronic device 22 determines that it has been more than one month since a first full data record has been accessed. For exemplary purposes, the portable electronic device 22 determines that this full data record is due for replacement since it has not been accessed in a period of time greater than one month. The portable electronic device 22 then prompts the user by displaying a query on the output 56 at step 204. For example, the display screen of the portable electronic device 22 prompts the user by displaying a question such as "Proceed with Memory Management?" and providing the user with the option to select yes or no, as shown in FIG. 8. If the user selects no, then the memory management process ends at step 205. If, however, the user selects yes, the portable electronic device then retrieves the data records of the database for which memory management is being carried out at step 206. Continuing with the present example, the portable electronic device 22 retrieves a first full data record from the database 40 that has not been accessed in more than one month at step 206. The portable electronic device 22 creates a representative viewable or audible sample of the first full data record at step 208. As described above, the representative viewable or audible sample is created by creating a viewable or audible portion of the data record, in the form of a thumbnail image data record, a sound clip of a portion of the sound data record or a representative page such as the first page of the document is created as a sample data record.

The portable electronic device 22 then marks the representative sample data record by, for example, adding a flag in the record header to indicate that the record is partial and that more of the record can be requested and stores the representative sample data record in the database 40 at step 210 by overwriting the representative sample data record over the full content data record, thereby replacing the full content data record with a representative sample data record and freeing up memory space. Again, it will be understood that the representative sample data record includes data sufficient to uniquely identify the corresponding full data record at the communication system 20. Thus, the representative sample data record acts as a reference to the respective data record of the communication system 20.

The portable electronic device 22 then determines if any further full data records exist that are to be replaced with representative sample data records at step 212. If not, the process ends at step 214. If there are further full data records that are to be replaced, the portable electronic device 22 continues by returning to step 206.

While the creation of the representative sample data record in the above embodiment has been described as being created by creating a viewable or audible portion of the data record in which a thumbnail image data record, an image that is the same size as the display on the portable electronic device 22, a sound clip of a portion of a sound data or a representative page such as the first page of the document is created, other representative viewable or audible sample data records can be created. For example, rather than creating a thumbnail image, a sound clip or a representative page, the data record can be created by performing compression, decreasing the size of the data record at the expense of the quality of the image or audio file, for example. Text files can also be reduced to a list of keywords, and may include frequency information.

According to one aspect there is provided a method of memory management in an electronic device, includes receiving at the electronic device, representative viewable or audible samples of data records, and storing the representative viewable or audible samples of data records in a memory of the electronic device. Each of the representative viewable or audible samples of data records includes one of a compressed version of a corresponding one of the backup data records, and a viewable or audible portion of the corresponding one of the backup data records.

According to another aspect there is provided a computer program product for memory management in an electronic device. The computer program product includes a computer-readable medium having computer-readable code embodiment therein for implementing in a computing device, the above method.

According to another aspect there is provided an electronic device including a receiver for receiving viewable or audible samples of data records, a memory connected to the receiver, and a processor connected to the receiver and the memory for storing the samples of data records in the memory, wherein each one of the samples includes one of a compressed version of a corresponding one of the backup data records, and a viewable or audible portion of the corresponding one of the backup data records.

In a particular aspect, a backup database is maintained by a synchronization server. Advantageously, when data records in the database maintained by the synchronization server are changed or when restoring data records to a portable electronic device, only representative viewable or audible samples of some of these data records are transmitted to the portable electronic device. The representative viewable or audible samples include compressed versions of the backup data records or viewable or audible portions of the backup data records. The viewable or audible portions include, for example, a thumbnail image, a sound file clip or a representative page of a multi-page record. Thus, when received by the portable electronic device, less memory is consumed when storing the data records for which only representative viewable or audible samples are received. The user of the device, however, is able to view or listen to the sample to determine if the user wishes to obtain the full data record. Clearly this is particularly useful for multimedia data records. Further, since less data is transmitted (as opposed to transmission of full data records), wireless synchronization is faster. Memory management on the device is also provided.

Although the embodiment described herein is directed to a particular implementation of the method and apparatus for synchronizing databases connected by wireless interface, it will be understood that modifications and variations to this embodiment are within the sphere and scope of the present application. For example, the data record update type can change depending on the type of data record and whether or not the data record has been accessed recently. Also, in the memory management processes described above including the process described with reference to FIG. 7, a determination whether or not to replace a full content data record with a representative sample was based on the period of time since the data record was last accessed. The determination, however, can be determined based on other factors. For example, it is contemplated that a user can designate certain data records as full content data records or can assign a priority to ensure that full content data records are stored if memory permits. Rather than asking user permission at step 204 of FIG. 7, the memory management process can be automatic. Also, rather than periodically performing the memory management process, the process can be carried out based on the amount of available memory at the portable electronic device. Thus, when a low memory condition event is detected, the memory management process is carried out. Alternatively, the memory management process can be carried out upon detection of user selection of a memory management option.

It will also be understood that step 192 of FIG. 6 and step 208 of FIG. 7 in which representative sample data records are created from full content data records for memory management purposes, can be carried out at the server based on a request from the portable electronic device. In this case, the server sends the representative sample data record to the device for storing by overwriting over the full content data record.

Other modifications and variations are also possible. For example, it will be understood that the portable electronic device 22 is not limited to three databases as any suitable number of databases is possible. Similarly, the communication system 20 may include any suitable number of databases. It will also be understood that the steps described hereinabove are not limited to the order in which they are described. For example, the transmission of data records at step 154 or the transmission of representative sample data records at step 162 can occur at the same time that the request is transmitted in step 142 and thus the request is "piggy-backed" on the transmission of data records or representative sample data records. Still other orders of steps are possible, as may occur to those skilled in the art.

Many other modifications and variations may occur to those skilled in the art. All such modifications and variations are believed to be within the sphere and scope of the present application.

What is claimed is:

1. A method of memory management in an electronic device, the method comprising:
   receiving at said electronic device from a synchronization server, representative viewable or audible samples of data records, wherein each representative viewable or audible sample comprises one of a viewable or audible compressed version of one of said data records and a viewable or audible portion of one of said data records;
   storing said representative viewable or audible samples of data records in a memory of said electronic device;
   determining whether or not a low memory condition exists in said memory of said electronic device;
   requesting a first full content data record, from the synchronization server, corresponding to a first representative viewable or audible sample stored in the memory of said electronic device, in response to a user input at an input device of said electronic device;
   receiving said first full content data record; and
   replacing said first representative viewable or audible sample with said first full content data record in the memory of said electronic device;
   if a low memory condition is determined, prior to said requesting, replacing an other data record stored in said memory with a representative sample of the other data record to thereby provide available memory;
   wherein said replacing an other data record stored in said memory with a representative sample of the other data record comprises:
      retrieving said other data record from said memory;
      performing a compression on said other data record to form a compressed data record; and
      writing the compressed data record over said other data record on said memory.

2. A method of memory management in an electronic device, the method comprising:
   receiving at said electronic device from a synchronization server, representative viewable or audible samples of data records, wherein each representative viewable or audible sample comprises one of a viewable or audible compressed version of one of said data records and a viewable or audible portion of one of said data records;
   storing said representative viewable or audible samples of data records in a memory of said electronic device;
   determining whether or not a low memory condition exists in said memory of said electronic device;
   requesting a first full content data record, from the synchronization server, corresponding to a first representative viewable or audible sample stored in the memory of said electronic device, in response to a user input at an input device of said electronic device;
   receiving said first full content data record; and
   replacing said first representative viewable or audible sample with said first full content data record in the memory of said electronic device;
   if a low memory condition is determined, prior to said requesting, replacing an other data record stored in said memory with a representative sample of the other data record to thereby provide available memory;
   wherein said replacing an other data record stored in said memory with a representative sample of the other data record comprises:
      retrieving said other data record from said memory;
      reducing the other data record to a viewable or audible portion of said other data record, in the form of one of a thumbnail image, a sound file clip and a representative page of a multi-page record; and
      writing the portion of the other data record over said other data record on said memory.

3. The method according to claim 1, further comprising:
prior to said replacing, determining that said other data record has not been accessed in a period of time.

4. An electronic device comprising:
a receiver for receiving viewable or audible samples of data records from a synchronization server, wherein each representative viewable or audible sample comprises one of a viewable or audible compressed version of one of said data records and a viewable or audible portion of one of said data records;
a memory connected to said receiver; and
a processor connected to said receiver and said memory for storing said samples of data records in said memory, determining whether or not a low memory condition exists in said memory of said electronic device, and generating a request for a first full content data record, from the synchronization server, corresponding to a first representative viewable or audible sample stored in said memory, in response to a user input at an input device of said electronic device, and replacing said first representative viewable or audible sample with said first full content data record, after receipt of the first full content data record at the receiver, in the memory of said electronic device;
said processor configured, if low memory condition is determined, prior to said generating of a request, to replace an other data record stored in said memory with a representative sample of the other data record to thereby provide available memory;
wherein said replacing an other data record stored in said memory with a representative sample of the other data record comprises:
   retrieving said other data record from said memory;
   performing a compression on said other data record to form a compressed data record; and
   writing the compressed data record over said other data record on said memory.

5. A non-transitory computer-readable medium having computer readable code embodied therein for:

receiving at an electronic device from a synchronization server, representative viewable or audible samples of data records, wherein each representative viewable or audible sample comprises one of a viewable or audible compressed version of one of said data records and a viewable or audible portion of one of said data records;

storing said representative viewable or audible samples of data records in a memory of said electronic device;

determining whether or not a low memory condition exists in said memory of said electronic device;

requesting a first full content data record, from the synchronization server, corresponding to a first representative viewable or audible sample stored in the memory of said electronic device, in response to a user input at an input device of said electronic device;

receiving said first full content data record; and replacing said first representative viewable or audible sample with said first full content data record in the memory of said electronic device if a low memory condition is determined, prior to said requesting, replacing an other data record stored in said memory with a representative sample of the other data record to thereby provide available memory;

wherein said replacing an other data record stored in said memory with a representative sample of the other data record comprises:
  retrieving said other data record from said memory;
  performing a compression on said other data record to form a compressed data record; and
  writing the compressed data record over said other data record on said memory.

6. The method according to claim 1, further comprising: repeating said determining, retrieving, performing a compression and writing until sufficient memory is available to store said first full content data record.

7. The method according to claim 2, further comprising:
  prior to said replacing, determining that said other data record has not been accessed in a period of time.

8. The method according to claim 2, further comprising: repeating said determining, retrieving, reducing and writing until sufficient memory is available to store said first full content data record.

9. The electronic device of claim 4, said processor further configured, prior to said replacing, to determine that said other data record has not been accessed in a period of time.

10. The electronic device of claim 4, said processor further configured to repeat said determining, retrieving, performing a compression and writing until sufficient memory is available to store said first full content data record.

11. The non-transitory computer readable medium of claim 5, further having computer readable code embodied therein for:
  repeating said determining, retrieving, performing a compression and writing until sufficient memory is available to store said first full content data record.

12. The non-transitory computer readable medium of claim 5, further having computer readable code embodied therein for:
  prior to said replacing, determining that said other data record has not been accessed in a period of time.

* * * * *